(12) United States Patent
Teraoka et al.

(10) Patent No.: US 6,435,853 B1
(45) Date of Patent: Aug. 20, 2002

(54) APPARATUS FOR PLASTICIZING MATERIAL FOR MOLDING THERMOPLASTIC RESIN FOAM

(75) Inventors: Atsuo Teraoka; Fumiaki Tsuda; Hideo Ohyabu, all of Hiroshima (JP)

(73) Assignee: The Japan Steelworks, Ltd., Tokyo (JP)

( * ) Notice: Subject to any disclaimer, the term of this patent is extended or adjusted under 35 U.S.C. 154(b) by 69 days.

(21) Appl. No.: 09/595,014

(22) Filed: Jun. 16, 2000

(30) Foreign Application Priority Data

Jun. 18, 1999 (JP) .......................................... 11-171892
Jun. 30, 1999 (JP) .......................................... 11-184796
Oct. 22, 1999 (JP) .......................................... 11-300412
Oct. 22, 1999 (JP) .......................................... 11-300473

(51) Int. Cl.[7] .............................................. B29C 44/36
(52) U.S. Cl. ........................ 425/4 C; 425/208; 425/562; 425/4 R
(58) Field of Search ................ 425/4 C, 208, 425/4 R, 562; 264/50, 53

(56) References Cited

U.S. PATENT DOCUMENTS

| | | | | |
|---|---|---|---|---|
| 3,808,953 A | * | 5/1974 | Herbst | 92/2 |
| 3,972,665 A | * | 8/1976 | Andrews, III | 425/205 |
| 3,981,649 A | * | 9/1976 | Shimano et al. | 425/4 C |
| 4,180,536 A | * | 12/1979 | Howell, Jr. et al. | 264/53 |
| 4,367,190 A | * | 1/1983 | Beach | 264/174 |
| 4,867,927 A | * | 9/1989 | Funaki et al. | 264/180 |
| 5,120,559 A | * | 6/1992 | Rizvi et al. | 426/446 |
| 5,597,525 A | * | 1/1997 | Koda et al. | 425/208 |
| 5,866,053 A | * | 2/1999 | Park et al. | 264/50 |
| 6,005,013 A | * | 12/1999 | Suh et al. | 521/79 |

* cited by examiner

Primary Examiner—Allan R. Kuhns
(74) Attorney, Agent, or Firm—Sughrue Mion, PLLC

(57) ABSTRACT

A method of plasticizing a material for molding thermoplastic resin foam including the steps of: rotating a screw disposed in a screw cylinder such that rotation and axial movement are permitted to plasticize thermoplastic resin, one of penetrating inactive liquid in a super critical state to molten resin in said screw cylinder and injecting inactive gas having a pressure not lower than the super critical gas pressure into said screw cylinder in a hot state not lower than the super critical temperature to realize a super critical state in said screw cylinder to cause said inactive gas to penetrate said molten resin, and injecting said molten resin for molding a foam member to which said inactive liquid has penetrated into a mold by moving said screw in the axial direction so that thermoplastic resin foam is obtained.

6 Claims, 5 Drawing Sheets

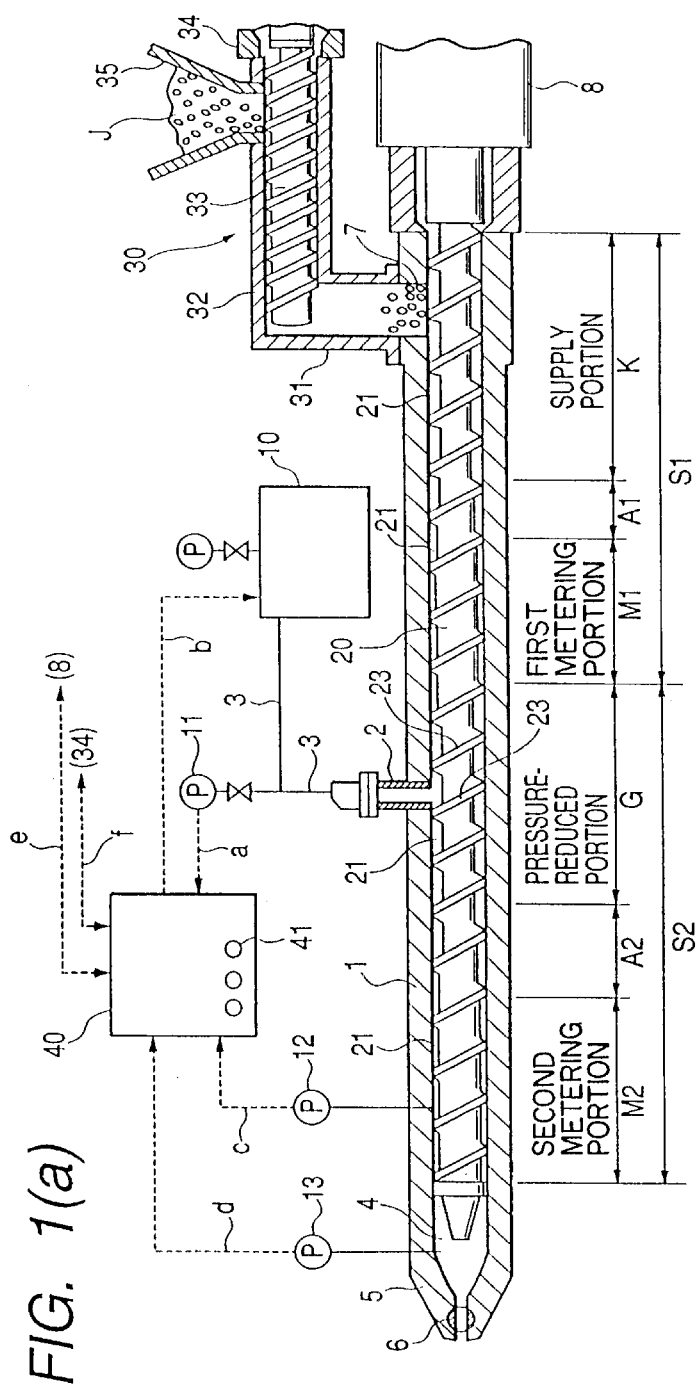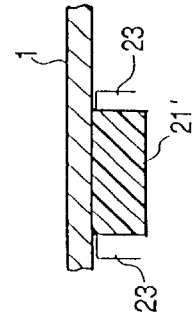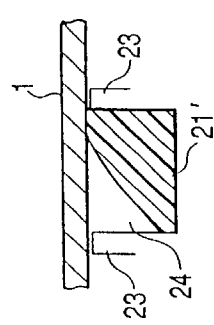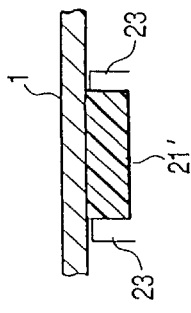

APPARATUS FOR PLASTICIZING MATERIAL FOR MOLDING THERMOPLASTIC RESIN FOAM

BACKGROUND OF INVENTION

1. Field of Invention

The present invention relates to a method of plasticizing a material for molding thermoplastic resin foam and a plasticizing apparatus. More particular, the present invention relates to a method of plasticizing a material for molding thermoplastic resin foam and a plasticizing apparatus arranged to perform the steps of: rotating a screw disposed in a screw cylinder such that movement in the rotational and axial directions of the screw is permitted to plasticize thermoplastic resin; causing inactive liquid, such as carbon dioxide solution or nitrogen solution in a super critical state to penetrate the molten resin or introducing inactive gas of carbon dioxide or nitrogen, the pressure of which is not lower than the super critical gas pressure into the screw cylinder which is in a hot state, the temperature of which is not lower than the super critical temperature, to create a super critical state in the screw cylinder so as to cause the inactive gas to penetrate the molten resin; and injecting the molten resin for molding a foam member to which the inactive fluid has penetrated into a cavity of a mold so that thermoplastic resin foam is obtained.

2. Related Art

A molding method or a molding apparatus has been disclosed in JP-A-8-258096, JP-A-10-230528 and so forth, in which thermoplastic resin is melted in a heating cylinder of an injection molding machine. Then, inactive liquid, such as carbon dioxide solution or nitrogen solution in a super critical state is caused to penetrate the molten resin. Then, the molten resin for molding a foam member to which the inactive fluid has caused to penetrate is injected into a mold. Thus, a thermoplastic resin foam member is molded. The apparatus for molding a foam member, that is, a manufacturing apparatus disclosed in JP-A-8-258096 incorporates a heating cylinder, a main screw disposed in the heating cylinder, a mixing screw disposed at the leading end of the main screw and an inactive-gas supply unit for supplying the inactive gas or inactive solution to the mixing screw portion. Therefore, when the main screw has been rotated to move the thermoplastic resin in the form of pellet to the leading end of the heating cylinder, the thermoplastic resin in the pellet state is melted owing to a shearing action caused from rotations of the main screw, heat produced owing to friction and heat applied from the outside of the heating cylinder. Then, the molten thermoplastic resin is furthermore uniformly melted by the mixing screw. When carbon dioxide solution in a super critical state is supplied in the foregoing state, the carbon dioxide solution penetrates the molten resin. The molten resin to which the carbon dioxide solution has penetrated is injected into the cavity of a mold by moving the main screw in the axial direction. When the molten resin has been cooled and solidified, the mold is opened. Thus, fine thermoplastic resin foam can be obtained.

The method of manufacturing thermoplastic resin foam disclosed in JP-A-10230528 incorporates two individual units one of which is a continuous plasticizing unit having a heating cylinder and a screw; the other one of which is an injecting unit having a plunger. Therefore, the two units enable the following thermoplastic resin foam to be obtained. That is, thermoplastic resin in the pellet state is supplied to the continuous plasticizing unit. Then, the screw is rotated. Hence it follows that the thermoplastic resin is melted owing to the shearing action caused from rotations of the screw, heat produced owing to the friction and heat applied from the outside of the heating cylinder. When carbon dioxide is supplied into the heating cylinder, a carbon dioxide penetrates the molten resin. The molten resin for molding a foam member to which carbon dioxide has penetrated is supplied to the injecting unit by moving the screw in the axial direction. Then, the plunger is operated to inject the molten resin into the mold so that thermoplastic resin foam is similarly obtained.

Either of the conventional manufacturing apparatuses enables the thermoplastic resin foam to be obtained. However, there are problems to be solved. Since the super critical temperature of carbon dioxide gas is 31° C. and the super critical pressure is 7.4 MPa, there arises a problem of unsatisfactory sealing when carbon dioxide solution in a super critical state, the pressure of which is higher than the foregoing level, is injected into the molten resin in the heating cylinder. That is, since the thermoplastic resin to be supplied to the heating cylinder is in a solid state in the form of pellet, sealing cannot be realized by the thermoplastic resin in the pellet form. Thus, there arises a problem in that injected carbon dioxide solution leaks to the material supply opening. In particular, the foregoing manufacturing apparatus structured such that carbon dioxide solution is injected into the heating cylinder inevitably encounters the problem of unsatisfactory sealing. The reason for this lies in the high pressure of the molten resin in the heating cylinder which is 10 MPa to 30 MPa. Either of the foregoing manufacturing apparatuses cannot overcome the problem of unsatisfactory sealing. The screw of the apparatus for manufacturing fine thermoplastic resin foam disclosed in JP-A-8-258096 is composed of the main screw and the mixing screw disposed at the leading end of the main screw. on the other hand, the apparatus for manufacturing thermoplastic resin foam disclosed in JP-A-10-230528 is composed of the continuous plasticizing unit having the heating cylinder and the screw and the injecting unit having the plunger. Therefore, each of the apparatus must have too complicated structure, causing the cost of the manufacturing apparatus to relatively be enlarged.

SUMMARY OF THE INVENTION

To solve the foregoing problems experienced with the conventional technique, an object of the present invention is to provide a method of plasticizing a material for molding thermoplastic resin foam and a plasticizing apparatus. Specifically, an object of the present invention is to provide a method of plasticizing a material for molding thermoplastic resin foam and a plasticizing apparatus capable of injecting, into a screw cylinder, inactive solution, such as carbon dioxide solution or nitrogen solution in a super critical state or inactive fluid composed of inactive gas, such as carbon dioxide gas or nitrogen gas, the pressure of which is relatively low in spite of a level not lower than the super critical pressure and overcoming the problem of unsatisfactory sealing though inactive fluid, the pressure of which is not lower than the super critical pressure, is injected. Another object of the present invention is to provide a method of plasticizing a material for molding thermoplastic resin foam and capable of using a low-cost plasticizing apparatus having a simple structure.

To achieve the foregoing objects, a plasticizing method according to the present invention uses a screw cylinder having a material supply opening formed at the rear end and an injecting nozzle disposed at the leading end. Moreover, a screw is employed which incorporates a first metallized portion, a pressure-reducing portion and a second metallized portion. The inactive liquid in the super critical state or the inactive solution composed of inactive gas, the pressure of which is not lower than the super critical pressure, is injected to a position corresponding to the pressure-reducing portion of the screw. The injected inactive fluid is sealed by molten resin in the first and second metallized portions.

The foregoing first aspect enables the inactive fluid having a relatively low pressure level to be injected when the pressure is not lower than the super critical pressure. When the inactive fluid having the pressure not lower than the super critical pressure is injected, the sealing effect of the molten resin in the first and second metallized portions causes leakage of injected inactive fluid to the material supply opening or the portion more forwards than the screw cylinder to be prevented. Since the inactive fluid can be injected at a relatively low pressure, pressure resisting design of the super critical gas generating apparatus and piping and design for realizing sealing can easily be performed. The inactive gas injected into the screw cylinder is made to be inactive fluid in a super critical state in the screw cylinder, the temperature of which is not lower than the super critical temperature. The inactive fluid in the super critical state is allowed to penetrate and dissolved in the molten resin owing to the rotations of the screw. Thus, molten resin for molding a foam member can be obtained.

A second aspect of the invention has a structure that the inactive fluid composed of inactive fluid in a super critical state of inactive gas having the pressure not lower than the super critical pressure is injected into a starved feed portion which is formed in the pressure-reducing portion of the screw and which is not filled with the molten resin.

The second aspect causes the area of contact between the molten resin and the injected inactive fluid to be enlarged. Hence it follows that the effect to quicken and uniform penetration of the inactive fluid in the super critical state can furthermore be improved.

A third aspect has a structure that the starved state of the starved feed portion is controlled according to the amount of thermoplastic resin to be supplied to the supply portion of the screw.

The third aspect enables the area of contact between the molten resin and the super critical state or the inactive fluid brought to the super critical state to be controlled. Moreover, an effect can furthermore be obtained to control penetration of the inactive fluid in the super critical state.

A fourth aspect is structured such that injection timing of inactive fluid in the super critical state of inactive gas having the pressure not lower than the super critical pressure is controlled by using a timer.

The fourth aspect enables the injection timing of the inactive fluid or the inactive gas to be constant. As a result, the state of foaming can be uniformed and foam can be fined. Hence it follows that thermoplastic resin foam exhibiting high quality can be obtained.

A fifth aspect is structured such that the pressure in a second stage consisting of the pressure-reducing portion, a second compressing portion and a second metallized portion is made to be not lower than the super critical pressure. As an alternative to this, the pressure in a metering opening formed at the leading end of the screw cylinder is made to be not lower than the super critical pressure.

The fifth aspect enables foaming of the molten resin for molding a foam member in the screw cylinder to be prevented.

To achieve the foregoing objects, the plasticizing apparatus according to the present invention is an apparatus for plasticizing a material for molding a thermoplastic resin foam member comprising a screw cylinder and a screw disposed movably in the rotational direction and the axial direction. When the screw is rotated, the thermoplastic resin is plasticized. When the screw is moved in the axial direction, the molten resin which has been plasticized is injected into a mold. The screw cylinder has a material supply opening formed adjacent to the rear end thereof. An injection nozzle is disposed at the leading end. A gas supply opening for injecting inactive fluid which is inactive liquid in the super critical state or inactive gas, the pressure of which is not lower than the super critical pressure, is formed between the material supply opening and the injection nozzle. The screw incorporates a first stage having a front portion formed into a first metallized portion formed in a range from the rear end to the leading end to correspond to the screw cylinder; a second stage similarly having a front portion formed into a second metallized portion and a rear portion formed into a low pressure portion in which the capacity of screw grooves is enlarged; and a screw head portion formed at the leading end. The gas supply opening of the screw cylinder is formed at the position corresponding to the low pressure portion of the second stage of the screw.

The plasticizing apparatus according to the present invention incorporates the screw cylinder and the screw disposed in the screw cylinder such that rotation in the rotational direction and movement in the axial direction are permitted. Therefore, the structure can considerably be simplified and, therefore, the cost can be reduced. The gas supply opening is formed in the forward portion of the first metallized portion, that is, at a downstream position. Therefore, an effect can be obtained. That is, when inactive liquid in the super critical state or inactive gas having the pressure not lower than the super critical pressure is injected, any counter flow of the injected inactive fluid to the material supply opening can be prevented owing to the sealing effect of the molten resin in the first metallized portion. Moreover, the gas supply opening is opened in the low pressure portion of the screw. Therefore, injection is permitted when the pressure for injecting the inactive fluid is lowered. Therefore, furthermore complete sealing can be realized also thanks to the sealing effect of the molten resin.

A second aspect of the plasticizing apparatus has a structure that the screw incorporates a second stage formed into a multiple-flight structure. As an alternative to this, the screw has a mixing piece disposed at the front portion of the second stage thereof.

The second aspect enables penetration of the inactive fluid to quickly and uniformly be completed. Therefore, foam particles obtained by using the apparatus for plasticizing the material for moldin th[0085] thermoplasti resi[008e] foa membe[00f8] ca[008e] b[0085] fined. Moreover, aesthetically pleasing, fine and uniform foam particles can be obtained. As a result, thermoplastic resin foam excellent in strength can quickly be obtained.

A third aspect has a structure that the screw has a screw head portion provided with a ball-checking counterflow preventive unit.

The ball of the third aspect has a small inertia force and delicate response. Therefore, the molten resin for molding a foam member which has been plasticized and metered can be injected without any leakage. Hence it follows that thermoplastic resin foam excellent in an accurate weight and quality can be obtained.

A fourth aspect has a structure that the screw cylinder has a plurality of grooves formed in the axial direction and provided for the inner wall adjacent to the material supply opening.

The fourth aspect attains an effect to be obtained in that the frictional force between the inner surface of the screw cylinder and the thermoplastic resin can be enlarged and the plasticizing performance can be improved.

A fifth aspect has a structure that the gas supply opening of the screw cylinder is provided with a heat resisting and gas-permeable member.

The fifth aspect enables leakage of the molten resin to the outside to be prevented when supply of the inactive liquid or the inactive gas. Moreover, the gas permeable area can be enlarged as compared with one small opening. As a result, an effect can be obtained in that the inactive liquid or the inactive gas can quickly be injected.

Other and further objects, features and advantages of the invention will be evident from the following detailed description of the preferred embodiments taken in conjunction with the attached drawings.

BRIEF DESCRIPTION OF THE DRAWINGS

FIGS. 1(a)–1(d) are diagrams showing an embodiment of a plasticizing apparatus for use in a method of plasticizing a material for molding thermoplastic resin foam, in which FIG. 1 (a) is a schematic front view including a cross sectional portion and showing the plasticizing apparatus, FIG. 1 (b) is a cross sectional view showing a first metering portion, FIG. 1 (c) is a pressure-reducing portion and FIG. 1 (d) is a cross sectional view showing a second metering portion together with molten resin;

FIGS. 3(a)–3(d) are diagrams showing the embodiment shown in FIG. 2 in detail, in which FIG. 3(a) is a cross sectional view showing a portion adjacent to a material supply opening of a screw cylinder, FIG. 3(b) is a cross sectional view taken along line (b)—(b) shown in FIG. 3(a), FIG. 3(c) is a cross sectional view showing an essential portion of a single flight portion of a second stage of the screw and FIG. 3(d) is a cross sectional view showing an essential portion of a double-flight portion of a second stage portion of the screw;

FIGS. 4(a)–4(d) are diagrams showing an embodiment of a mixing piece of the apparatus for plasticizing the material for molding the thermoplastic resin foam according to the present invention, in which FIGS. 4(a) to 4(d) are perspective views showing various mixing pieces; and FIGS. 5(a)–5(b) are diagrams showing an embodiment of a counterflow preventive unit of the apparatus for plasticizing the material for molding the thermoplastic resin foam, in which FIG. 5(a) is a cross sectional view showing a first embodiment and FIG. 5(b) is a cross sectional view showing a second embodiment.

DETAILED DESCRIPTION OF PREFERRED EMBODIMENTS

Figure 2:
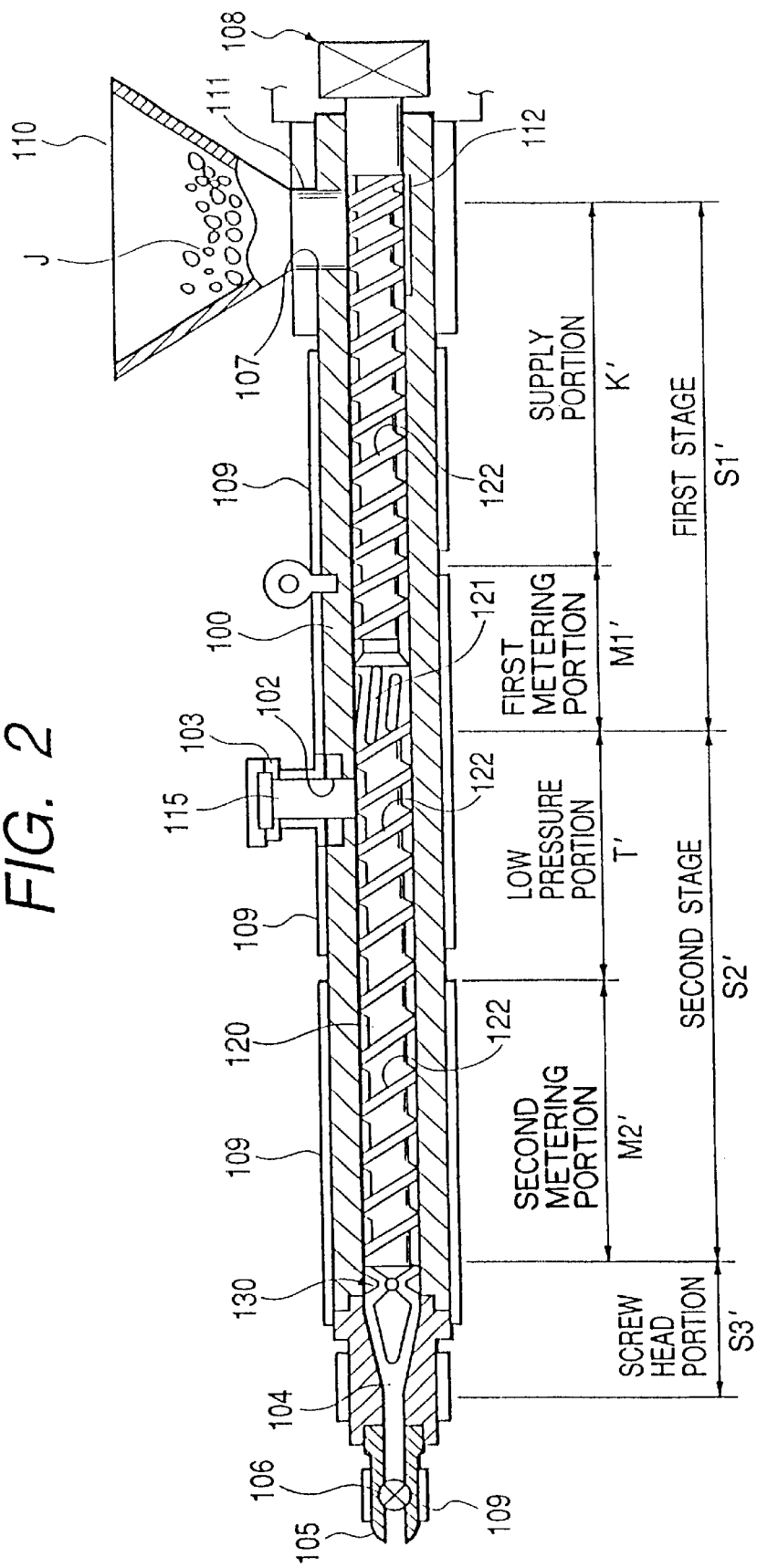
FIG. 2 is a schematic front view including a cross sectional portion and showing an embodiment of the apparatus for plasticizing the material for molding the thermoplastic resin foam according to the present invention.

An embodiment of a plasticizing apparatus for use in embodying a plasticizing method according to the present invention will now be described. As shown in FIG. 1(a), the plasticizing apparatus according to this embodiment includes a screw cylinder 1 and a screw 20 disposed in the screw cylinder 1 and arranged to be rotated in the plasticizing direction. Moreover, the screw 20 can be moved in the axial direction, that is, the injecting direction.

The screw cylinder 1 has a predetermined length in the axial direction. A gas supply opening 2 formed from the outside of the screw cylinder 1 to reach the inside portion of the screw cylinder 1 is formed at substantially the intermediate position of the screw cylinder 1. Inactive liquid in a super critical state in terms of the pressure and the temperature or an inactive gas having a pressure not lower than the super critical pressure is supplied into the screw cylinder 1 through the gas supply opening 2. A gas pipe 3 allowed to communicate with a super-critical-gas generating unit 10 is hermetically connected to the gas supply opening 2. In this embodiment, the inactive gas, such as carbon dioxide gas or nitrogen gas, is injected into molten resin in the screw cylinder 1 in a super critical state or at a pressure not lower than the super critical pressure, for example, about several MPa to about 20 MPa. Therefore, the super-critical-gas generating unit 10 includes a compressor, a heater and a pressure control valve.

A portion adjacent to the leading end of the screw cylinder 1 when the screw cylinder 1 is viewed in FIG. 1 is formed into a metering, or plasticizing, chamber 4. An injection nozzle 5 is disposed at the leading end of the metering chamber 4. The injection nozzle 5 is provided with a shut-off valve 6. A material supply opening 7 is formed adjacent to the rear end of the screw cylinder 1. A screw operating unit 8 is disposed at the rear end of the screw cylinder 1. Since a screw operating unit 8 has a known structure, detailed description of the screw operating unit 8 is omitted. For example, the screw operating unit 8 incorporates a rotational motor and a unit composed of a piston and a cylinder. The output shaft of the rotational motor and a screw shaft at the rear end of the screw 20 are connected to each other by a mechanical means, such as a spline shaft or a slide key. Therefore, the screw 20 is able to move in the axial direction when it is rotated. The piston of the unit composed of the piston and the cylinder enables super critical pressure to be applied to the molten resin when a metering operation is performed. Moreover, the metered molten resin for molding a foam member can be injected. A plurality of heaters each of which is individually controlled to generate heat are disposed on the outer surfaces of the screw cylinder I and the injection nozzle 5. Thus, the temperature of the inside portion of the screw cylinder 1 not lower than the super critical temperature, for example, 100° C. or higher is maintained. Note that the heaters are omitted in FIG. 1.

Thermoplastic resin J is arranged to be supplied to the screw cylinder 1 in a controlled quantity. Therefore, a screw-type mechanical feeder 30 is provided. The screw-type feeder 30 has a supply cylinder 31 connected to a material supply opening 7 of the screw cylinder 1. The screw-type feeder 30 has a known structure incorporating a moving cylinder 32, a moving screw 33 capable of rotating in the moving cylinder 32 and a feeder operating unit 34 for rotating the moving screw 33. A hopper 35 is joined to the moving cylinder 32. Therefore, when the number of revolutions of the operating unit 34 is controlled, the quantity of the thermoplastic resin J to be supplied to the screw cylinder 1 is controlled. As a result, the quantity of the molten resin in a pressure-reducing portion G to be described later can be controlled.

The screw 20 is moved in the axial direction when a plasticizing operation or the injecting operation is performed. As shown in FIG. 1(a), the rear end portion of the screw 20 is formed into a first stage S1 and a leading end portion formed into a second stage S2 to substantially correspond to the screw cylinder 1. The first stage S1 incorporates supply portion K, a first compressing portion A1 more forward than the supply portion K and a first metering, or plasticizing, portion M1 more forward than the first compressing portion A1. The supply portion K corresponds to the material supply opening 7 of the screw cylinder 1 and having a screw groove 21 having a relatively large depth. A screw groove 21 of the first compressing portion A1 has the depth which is gradually changed from the depth of the groove in the supply portion K to the depth of the screw groove in the first metering portion M1. A screw groove 21 formed in the first metering portion M1 is a shallow depth. The thermoplastic resin J supplied from the supply portion K owing to the rotations of the screw is supplied with heat from the heater provided for the screw cylinder 1. Moreover, the thermoplastic resin J is melted in the first compressing portion A1 while it is being compressed and sheared. In the first metering portion M1, the thermoplastic resin J is completely melted. Thus, leakage of the injected inactive fluid toward the supply portion K can be prevented. That is, the thermoplastic resin J is sealed by the molten resin.

The second stage S2 incorporates a pressure-reducing portion G following the first stage S1; a second compressing portion A2 more forwards than the pressure-reducing portion G; and a second metering, or plasticizing, portion M2 more forwards than the second compressing portion A2. A screw groove 21 formed in the pressure-reducing portion G has a large depth. Thus, the pressure of the molten resin fed from the first stage S1 is reduced. Thus, a starved feed portion which is not filled with the molten resin is created. As a result, the inactive fluid can easily be injected. The pressure-reducing portion G has a length with which the gas supply opening 2 can be covered even after the screw cylinder 1 has been moved in the axial direction. A screw groove 21 formed in the second compressing portion A2 and having a relatively small depth and a screw groove 21 formed in the second metering portion M2 and having a small depth are filled with the molten resin. Thus, the injected inactive fluid is sealed by the molten resin in the second metering portion.

In the foregoing embodiment, the screw-type feeder 30 is provided as the mechanical supply unit. As a matter of course, a rotary feeder is able to control the quantity of the thermoplastic to resin J to be supplied as a substitute for the screw-type feeder 30. Although the screw groove 21 in the pressure-reducing portion G of the screw 20 has a large depth to enlarge the capacity from the adjacent flight 23, the width of the flight 23 may be reduced to enlarge the capacity between the flights 23 as a substitute for enlarging the depth of the screw groove 21. The pitch of the flights 23 may be elongated to enlarge the capacity between the flights 23. As a matter of course, the pitch can be elongated by enlarging the depth of the screw groove 21 and by reducing the width of the flight 23.

The plasticizing apparatus according to this embodiment incorporates a controller 40 including a control device, a timer and so forth. A setting portion 41 is provided for the controller 40. The setting portion 41 is operated to set a variety of values to perform the plasticizing operation. The values include, for example, the upper and lower limits of the pressure of the super critical gas; and setting of a timer for setting time at which supply of the inactive fluid in the super critical state is started and time at which the same is interrupted. Moreover, the values include the rotational speed of the rotational moor of the screw operating unit 8, the back pressure which is exerted when the plasticizing operation is performed, the operating speed of the operating unit 34 of the screw-type feeder 30 and the temperature of each of the heaters provided for the outer surfaces of the screw cylinder 1 and the injection nozzle 5. To maintain the variety of the set values, the control device performs, for example, feedback control. In a case where the pressure of the inactive fluid has deviated from the upper and lower limits, an alarm is produced. Moreover, the operation of the plasticizing apparatus is interrupted. The foregoing controller 40 and a pressure meter 11 provided for the gas pipe 3 are connected to each other through a signal line a. The controller 40 is connected to the super-critical-gas generating unit 10 through a signal line b. Similarly, the controller 40 and the pressure meter 12 provided for the second metering portion M2 of the screw cylinder 1 are connected to each other through a signal line c. The controller 40 and the pressure meter 13 provided for the metering chamber 4 are connected to each other through a signal line d. The controller 40 and a for the screw operating unit 8 are connected to each other through a signal line e. The controller 40 and the operating unit 34 are connected to each other through a signal Line f.

An example of a plasticizing operation which is performed by the apparatus for plasticizing the material for molding the thermoplastic resin foam member will now be described. Initially, the thermoplastic resin J is introduced into the screw-type feeder 30. Moreover, the setting portion 41 provided for the controller 40 is operated to set the various values required to perform the plasticizing operation. The various values include upper and lower limits of the pressure of the inactive fluid in the gas pipe 3; the pressure in the second metering portion M2; the pressure in the metering chamber 4; the number of revolutions of the operating unit 34; the temperature of the heater; the position at which metering of the screw 20 is completed; and the number of revolutions of the screw 20. Then, the shut-off valve 6 is shut off. Then, the moving screw 33 is operated by the operating unit 34. Thus, the thermoplastic resin J is supplied to the screw cylinder 1 at a set ratio. Moreover, the screw operating unit 8 is operated to rotate the screw 20 so as to start a metering step. The thermoplastic resin J is supplied to the supply portion K of the screw 20. The thermoplastic resin J fed owing to the rotations of the screw 20 is melted owing to heat applied from the heater, friction caused from the rotations of the screw 20 and heat generated owing to the shearing action. Then, the molted thermoplastic resin J is allowed to pass through the first compressing portion A1 so as to be supplied to the first metering portion M1. The thermoplastic resin J is completely melted in the first metering portion M1, and then the thermoplastic resin J is supplied to the next second stage S2.

When the timer of the controller 40 has detected a lapse of time, inactive fluid, such as carbon dioxide solution or nitrogen solution in the super critical state, or the inactive gas having the pressure not lower than the super critical pressure is supplied to the pressure-reducing portion G of the second stage S2 from the super-critical-gas generating unit 10. The injected inactive gas is heated in the hot pressure-reducing portion G so as to be formed into inactive liquid, that is, inactive fluid in a super critical state. FIG. 1(b) is a diagram showing a state where the resin completely melted in the first metering portion Ml fills a space among the inner surface of the screw cylinder 1, the flights 23 and the outer surface 21' of the screw shaft. The molten resin in the first metering portion M1 prevents leakage of the injected inactive fluid toward the supply portion K. When the inactive fluid is injected, the screw groove 21 of the pressure-reducing portion G is deep and, therefore, the pressure of the molten resin is reduced. Therefore, the starved feed portion is created in which a non-filled portion 24 is present as shown in FIG. 1(c). Therefore, injection can be performed at a relatively low pressure of several MPa to about 20 MPa in spite of the pressure level higher than the super critical pressure. The injected inactive fluid is able to easily penetrate the molten resin owing to the rotations of the screw 20. Then, the inactive fluid is allowed to pass through the second compressing portion A2 of the second stage S2 so as to be fed to the second metering portion M2. Also in the foregoing case, the inactive fluid is supplied in order to prevent a fact that the pressure in the second compressing portion A2 and that in the second metering portion M2 are not higher than the super critical pressure. A state of the molten resin in the second metering portion M2 is shown in FIG. 1(d). Leakage of the inactive fluid injected owing to the molten resin in the second metering portion M2 toward the forward portion of the screw cylinder 1 can be prevented.

The molten resin to which the inactive fluid has penetrate is formed into the molten resin for molding a foam member, and then supplied to the metering chamber 4. As the metering operation proceeds, the screw 20 is moved rearwards owing to the pressure of the metered molten resin for molding the foamed member. The pressure of the metering chamber 4 is measured with the pressure meter 13. In order to prevent a fact that the measured pressure is not higher than the super critical pressure, the screw 20 is pressurized in the injecting direction when the plasticization metering operation is performed. In case of rearward movement for a predetermined distance, the rearward movement is detected and the metering process is completed. Then, the injecting step is started. Also in the injecting step, injection of the inactive fluid is continued. When the timer has detected a lapse of time, injection is interrupted. Note that the screw 20 is moved in the injecting direction to apply pressure before the injecting step is started in order to prevent reduction in the pressure of the metered molten resin for molding a foam member to a level not higher than the super critical pressure. As an alternative to this, the screw 20 is rotated in the plasticizing direction at low speed. Thus, the molten resin for molding a foam member can be obtained. That is, the plasticizing step is completed.

Then, the shut-off valve 6 is opened to move the screw 20 in the axial direction to inject the molten resin into the cavity of the mold. After the resin has been cooled and solidified, the mold is opened. As a result, thermoplastic resin foam having a mean cell diameter of 0.01 $\mu$m to 50 $\mu$m of the molded member and a mean cell density of $10^8$ pieces/cm$^3$ to $10^{16}$ pieces/cm$^3$ can be obtained. Then, a similar process is performed such that plasticization, injection and molding are performed.

When inactive gas having the pressure not lower than the super critical pressure and a temperature lower than the super critical temperature is supplied to the pressure-reducing portion G, the inactive gas is heated in the pressure-reducing portion G. Thus, the super critical state is realized. To prevent decrease in the temperature of the molten resin in the pressure-reducing portion G, the inactive gas to be injected may previously be heated by using, for example, waste heat.

An embodiment of the plasticizing apparatus will now be described with reference to FIGS. 2 to 5. FIG. 2 is a front view including a partial cross sectional view and schematically showing the overall body of the plasticizing apparatus. As shown in FIG. 2, the apparatus for plasticizing the material for molding a thermoplastic-resin foam member according to this embodiment comprises a screw cylinder 100 and a screw 120 disposed in the screw cylinder 100 so as to be rotated and enabled to move in the axial direction, that is, in the injecting direction.

The screw cylinder 100 has a predetermined length in the axial direction and a gas supply opening 102 formed at substantially the intermediate position in a region from the outer surface of the screw cylinder 100 to the inside portion of the screw cylinder 100. The screw cylinder 100 is supplied with inactive liquid, such as carbon dioxide solution or nitrogen solution, in a super critical state in terms of the pressure and the temperature of inactive gas, such as carbon dioxide gas or nitrogen gas having a pressure not lower than the super critical pressure through the gas supply opening 102. A gas pipe 103 is hermetically connected to the gas supply opening 102. As described later, inactive liquid, such as carbon dioxide solution or nitrogen solution, in the super critical state or inactive gas having the pressure not lower than the super critical pressure is injected into the molten resin having the pressure of several MPa to about 20 MPa. Note that the compressor, heaters and pressure control valve for obtaining the inactive fluid having the foregoing pressure and temperature are omitted from FIG. 2.

A left-hand portion of the screw cylinder 100 adjacent to the leading end thereof when the screw cylinder 100 is viewed in FIG. 1 is formed into a metering chamber 104. An injection nozzle 105 is provided for the leading end of the metering chamber 104. The injection nozzle 105 is provided with an injection nozzle 105. The injection nozzle 105 is provided with a shut-off valve 106. A material supply opening 107 is formed at a position adjacent to the rear end of the screw cylinder 100. A screw operating unit 108 is provided for the rear end of the screw cylinder 100. Since the screw operating unit 108 may have the known structure, description of the screw operating unit 10 is omitted. For example, the screw operating unit 108 incorporates a rotational motor and a unit composed of a piston and a cylinder. An output shaft of the rotational motor and a screw shaft disposed at the rear end of the screw 120 are connected to each other by a mechanical means, such as a spline shaft or a slide key. Therefore, the screw 120 is able to move in the axial direction during rotation of the screw 120. The piston of the unit composed of the piston and the cylinder enables the screw 120 to be pulled, that is, so-called "sucking-back" is permitted when plasticizing and metering are performed. Moreover, injection of the metered molten resin for molding a foam member is permitted. A plurality of heaters 109, each of which is individually controlled to generate heat, are provided for the outer surfaces of the screw cylinder 100 and the injection nozzle 105. A hopper 110 of a hopper 110 is engaged to a material supply opening 107 of the screw cylinder 100.

The screw 120 is moved in the axial direction in each of the plasticizing step and the injecting step. As shown in FIG. 2, the screw 120 has a first stage S1', a second stage S2' and a screw head portion S3' formed in this order to correspond to the screw cylinder 100. A forward portion of the first stage S1' is formed into a first metering portion M1', while a rear portion of the same is formed into a supply portion K'. A mixing pieces 121 and so forth are provided for the first metering portion M1'. A screw flight 122 of the supply portion K' has a relatively small depth. As a matter of course, the first metering portion M1' may have a full-flight structure having no mixing piece. A front portion of the second stage S2' is formed into a second metering portion M2', while a rear portion of the same is formed into a low pressure portion T'. The groove in the screw flight 122 in the low pressure portion T' has a relatively small depth. Thus, inactive fluid, such as carbon dioxide solution or nitrogen solution, can easily be injected. As a matter of course, the width of the screw flight 122 may be reduced to enlarge the cap of the screw groove so as to constitute the low pressure portion T'.

The foregoing plasticizing apparatus is able to plasticize the thermoplastic resin to mold the thermoplastic resin foam and inject the molten resin for molding a foam member to which the inactive fluid has penetrated into the mold. In this embodiment, a portion adjacent to the material supply opening 107 of the screw cylinder 100, the screw 120 of the second stage S2', the leading end portion of the second metering portion M2' of the screw 120, the screw head portion S3', the gas supply opening 102 or the gas pipe 103 are structured as follows.

Figure 3A:
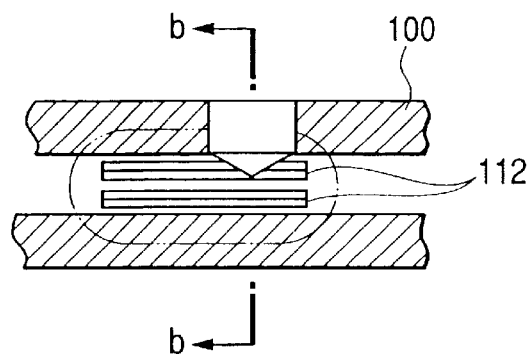
Figure 3B:
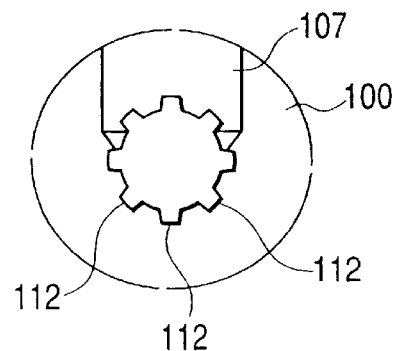
Figure 3C:
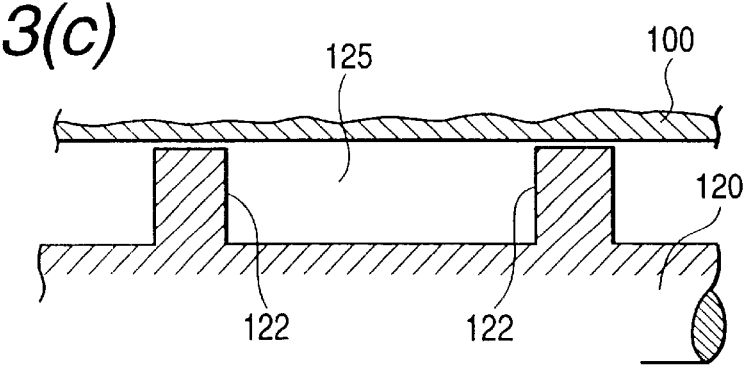
Figure 3D:
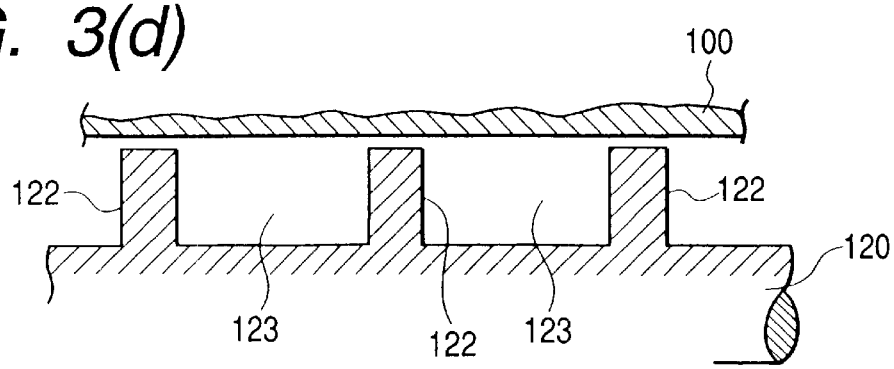

That is, the inner wall of the screw cylinder 100 adjacent to the material supply opening 107 is, as shown in FIGS. 3(a) and 3(b), provided with a plurality of grooves 112 each having a predetermined length in the axial direction. The length of each of the grooves 112 is arranged such that the leading end portion is elongated with respect to the material supply opening 107 in order to cover the distance for which the screw 120 is moved in the plasticizing step. The grooves 112 improve the reliability of the engagement of the thermoplastic resin to the screw 120. Thus, the plasticizing performance can be improved. The screw flight 122 of the screw 120 in the first stage S1' is formed into a double-flight structure. FIG. 3(c) is a cross sectional view showing a single flight. FIG. 3(d) is a cross sectional view showing a double flight. The cross sectional area of each of the flight grooves 123 of the double flight is fined as compared with the cross sectional area of the flight groove 125 which is the single flight. Thus, penetration and dispersion of the injected inactive fluid can be enhanced. As a matter of course, a multiple flight, for example, a triple flight may be employed. As a matter of course, the single flight screw or a full-flight screw is sometimes able to satisfactorily enhance the penetration of the inactive fluid.

Figure 4A:
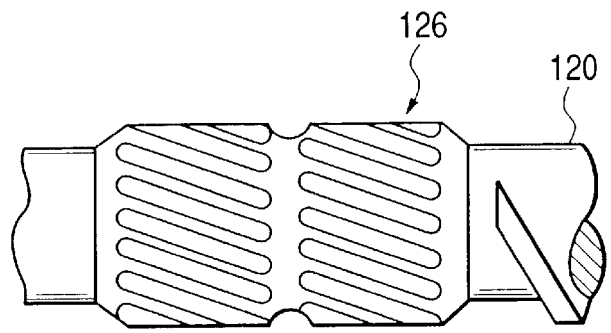
Figure 4B:
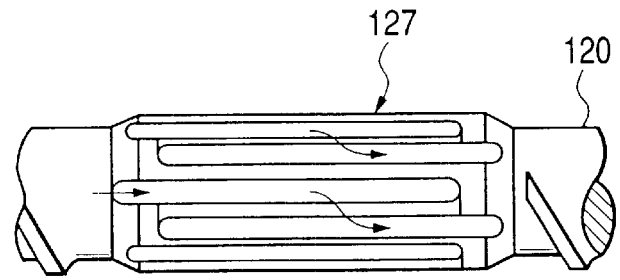
Figure 4C:
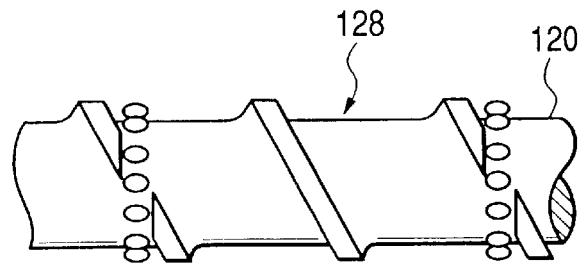
Figure 4D:
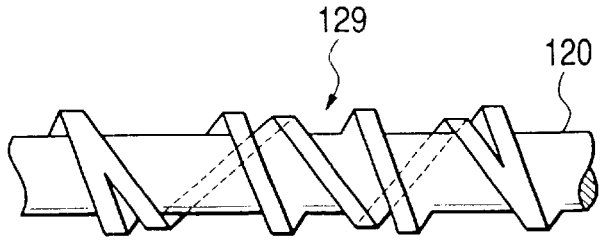

In this embodiment, a mixing piece is formed in the front portion of the second metallized portion M2' in the second stage S2' of the screw 120. The mixing piece may be formed variously. FIG. 4 shows examples of the mixing piece. Since the mixing piece has a known structure, description about the mixing piece is omitted. FIG. 4(a) shows a Dulmage mixing piece 126. Similarly FIG. 4(b) shows a Madock mixing piece 127. FIG. 4(c) shows a pin-type mixing piece 128. FIG. 4(d) shows a double-flight mixing piece 129. Since the mixing pieces 126 to 129 are provided, injected inactive fluid can uniformly be dispersed. Therefore, the internal foaming layer of the thermoplastic resin foam can be fined and uniformed. As a matter of course, uniform dispersion can sometimes be realized without the mixing piece.

Figure 5A:
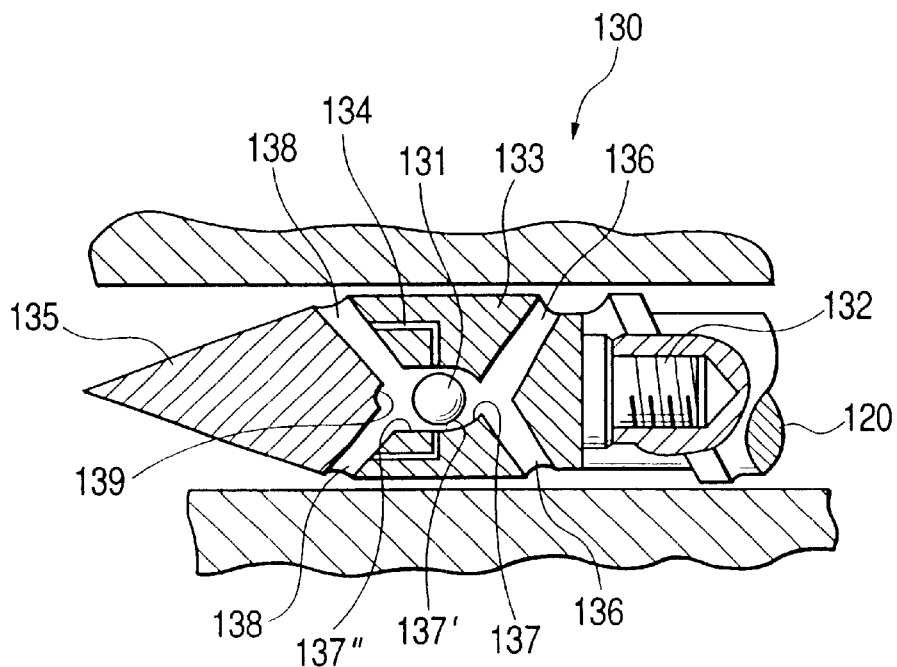

An example of a counterflow preventive unit provided for the screw head portion S3' is shown in FIG. 5. A counterflow preventive unit 130 shown in FIG. 5(a) according to a first embodiment is constituted by a ball 131. Specifically, the counterflow preventive unit 130 according to the first embodiment incorporates a retainer 133 joined to the leading end of the screw 120 with a screw 132; a screw head 135 similarly joined with a screw 134 after the ball 131 has been placed; and a ball 131 capable of moving in the axial direction in a ball chamber formed in a region from the retainer 133 to the screw head 136. The retainer 133 has a plurality of first resin passages 136 formed radially in a region from a position adjacent to the outer surface toward the center such that the first resin passages 136 are inclined in order to decrease resistance caused from passage. A first ball chamber 137' is formed in the axial direction substantially in parallel with the central portion of the forward confluence. A point at which the first ball chamber 137' and the first resin passages 136 are merged with one another is formed into a seat surface 137 to which the ball 131 is seated when the counterflow is prevented. The screw head 135 is formed into a head portion having a tapered leading end, that is, the diameter is reduced. A screw 134 is formed at the rear end of the screw head 135. A second ball chamber 137" having a predetermined depth is, from the rear end, formed at the central portion of the screw head 135. The second ball chamber 137" and the first ball chamber 137' have the same diameter. When assembly has been completed as shown in FIG. 5(a), the first and second ball chambers 137' and 137" form a ball chamber having a predetermined length in the axial direction and a predetermined diameter in cooperation with each other. A plurality of tapered second resin passages 138 are outwards opened from the second ball chamber 137" of the screw head 135. A position at which branching of the plural second resin passages 138 is started is formed into a contact portion 139 which receives the ball 131 in the plasticizing step.

Therefore, the ball 131 is forcibly allowed to flow toward the contact portion 139 by the molten resin for molding a foam member so as to be received by the contact portion 139. The molten resin for molding the foam member in the received state is allowed to pass through the first resin passages 136, the ball chamber, gaps between the ball 131 and the second resin passages 138 and the second resin passages 138 so as to be moved to the metering chamber 104. When the injection step is performed, the ball 131 is pushed to the seat surface 137 by the molten resin for molding the foam member in a state of the counterflow so as to be seated on the seat surface 137. Thus, counterflow of the molten resin for molding the foam member can be prevented. A pilot opening (not shown in FIG. 5) may be formed in the screw head 135 to cause the plasticized molten resin for molding the foam member to pass through the pilot opening in the injection step. Thus, the molten resin for molding the foam member directly acts on the ball 131 so as to cause the ball 131 to instantaneously be seated on the seat surface 137.

In this embodiment, the counterflow preventive unit 130 is provided for the leading end of the screw 120. Therefore, counterflow of the molten resin for molding the foam member containing inactive fluid in the super critical state to the second metering portion M2' can be prevented after plasticization has been completed. As a result, the pressure not lower than the super critical gas pressure in the metering chamber 104 can be maintained. Hence it follows that foaming of the molten resin for molding the foam member in the metering chamber 104 can be prevented.

Figure 5B:
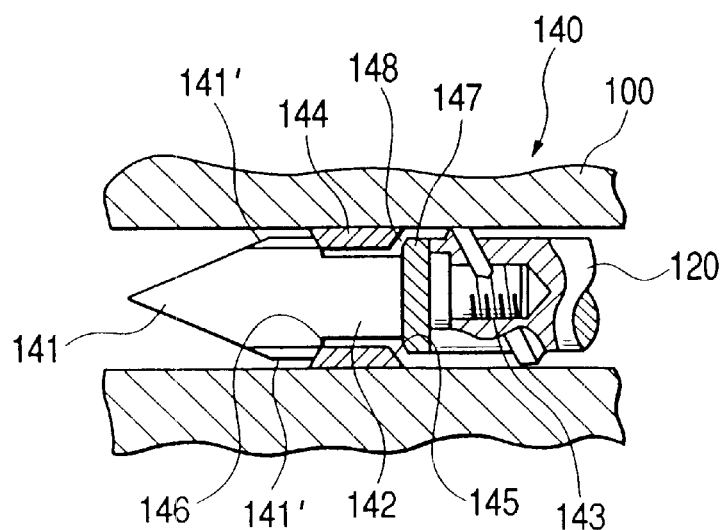

FIG. 5(b) shows a second embodiment of the counterflow preventive unit. A counterflow preventive unit 140 according to this embodiment incorporates an annular retaining metal member 147 indirectly joined to the leading end of the screw 120 by joining a screw head 141; a screw head 141 joined to the leading end of the screw 120 with a screw 143; and a counterflow preventive ring 144 provided for a small-diameter portion 142 of the screw head 141 such that axial movement of the counterflow preventive ring 144 is permitted. The screw head 141 is constituted by a head portion having a tapered leading end, the small-diameter portion 142 following the head portion and a screw 143 following the small-diameter portion 142. The outer surface of the counterflow preventive ring 144 is disposed in hermetic contact with the inner surface of the screw cylinder 100. A gap is formed between the foregoing inner surface and the outer surface of the small-diameter portion 142 of the screw head 141 to permit flowing of the molten resin for molding the foam member. The front and rear ends of the gap are formed into the tapered portions 145 and 146. The rear tapered portion 145 is seated on a seating surface 148 of the retaining metal member 147 when counterflow is prevented. In a plasticizing step, the counterflow preventive ring 144 is moved forwards so that the tapered portion 146 of the counterflow preventive ring 144 is brought into contact with projections 141' provided for the screw head 141. Since the projections 141' are radially formed, flow of the molten resin for molding the foam member is permitted. Also in this embodiment, the pressure not lower than the super-critical gas pressure in the metering chamber 4 can be maintained. As a matter of course, foaming of the molten resin for molding the foam member in the metering chamber 4 can be prevented.

A heat-resisting filter, for example, a porous gas-permeable metal member 115, for example, "PORCER-ACS" (trade name) constituted by, for example, sintered alloy, is disposed at the trailing end of the gas supply opening 102 or the gas pipe 103 shown in FIG. 2. Since the gas-permeable metal member 115 is provided as described above, leakage of the molten resin to the outside occurring when supply of the inactive fluid has been interrupted can be prevented. Note that the gas supply opening 102 may be constituted by a small opening, such as a de-gassing opening formed in the conventional mold. In this case, the inactive fluid is supplied into the screw cylinder 100 through the foregoing small opening. Even in the foregoing case, counterflow of the molten resin to the outside can be prevented. In the foregoing case, time required to inject the inactive fluid is elongated.

On the other hand, the structure of this embodiment incorporating the gas-permeable metal member 115 is able to prevent leakage caused from counterflow of the molten resin. Moreover, time required to inject the inactive fluid can be shortened because the wide area can be used to pass the inactive fluid.

An example of a plasticizing operation using the apparatus for the material for molding a thermoplastic-resin foam member will now be described. Although the plasticizing apparatus according to this embodiment is able to perform an automatic plasticizing operation and a manual plasticizing operation under control of the control unit, a semi-automatic plasticizing operation will now be described. Initially, the thermoplastic resin J is introduced into the hopper 110. A setting device provided for the controller is operated to set a variety of values required to perform the plasticizing operation and the injecting operation. The variety of values include the temperature of each of the heaters 109, the position at which metering of the screw 120 is completed and the rotational speed of the screw 120. Moreover, the shut-off valve 106 is shut off. Then, the screw operating unit 108 is operated to rotate the screw 120 so that the plasticizing step is started. The thermoplastic resin J is supplied to the first stage S1' of the screw 120. Since the plural grooves 112 are, as shown in FIGS. 3(*a*) and 3(*b*), formed in the inner wall of the screw cylinder 100 adjacent to the material supply opening 107, the thermoplastic resin J can efficiently be supplied. The thermoplastic resin J moved owing to the rotations of the screw 120 is melted in the first metering portion M1' owing to heat supplied from the heaters 109, friction caused from the rotations of the screw 120 and heat generated owing to shearing operation. Then, the thermoplastic resi[008e] J is moved to the second stage S2'.

Then, inactive liquid, such as carbon dioxide solution or nitrogen solution in the super critical state or inactive gas having the pressure not lower than the super critical pressure is injected into the low pressure portion T' of the second stage S2'. Since the groove in the screw flight 122 in the low pressure portion T' is enlarged and the pressure of the molten resin is reduced in the foregoing case, the inactive gas is injected at a relatively low pressure of several MPa to about 20 MPa which is not lower than the super critical gas pressure. Since the temperature in the screw cylinder 100 is raised to about 100° C. to about 200° C., the injected inactive gas is formed into liquid nitrogen in the super critical state. Thus, the inactive gas penetrates the molten resin. Note that the inactive gas to be injected may previously be heated by using waste heat to prevent decrease in the temperature of the molten resin.

When injection is performed as described above, the sealing effect of the molten resin completely melted in the first metering portion M1' prevents counterflow of the injected inactive fluid to the material supply opening 107. The injected inactive fluid easily and quickly penetrates the molten resin because the screw flight 122 of the second stage S2' has the double-flight structure. Then, the inactive fluid is moved to the second metering portion M2' of the second stage S2'. Since this embodiment has the structure that the mixing pieces 126 to 129 are provided for the second metering portion M2', dispersion of the injected inactive fluid can furthermore be enhanced. Then, the inactive fluid is moved to the metering chamber 104. At this time, the ball 131 and the counterflow preventive ring 144 of the counterflow preventive units 130 and 140 are moved to the leading end. Therefore, flow of the molten resin for molding the foam member is permitted. As plasticization or metering proceeds, the screw 120 is moved rearwards owing to the pressure of the metered molten resin for molding the foam member or assistance of the suck-back force. After the screw 120 has moved rearwards for a predetermined distance, the rearward movement is detected. Thus, metering, that is, plasticizing is completed.

Then, the shut-off valve 106 is opened to move the screw 120 in the axial direction to inject the molten resin for molding the foam member into the cavity of the mold. At this time, the ball 131 and the counterflow preventive ring 144 of the counterflow preventive units 130 and 140 are seated on the seat surfaces 135 and 148. Thus, counterflow of the molten resin for molding the foam member can be prevented. After the molten resin for molding the foam member has been cooled and solidified, the mold is opened. Thus, thermoplastic resin foam can be obtained which has a mean cell diameter of 0.01 $\mu$m to 50 $\mu$m and a mean cell density of $10^8$ pieces/cm$^3$ to $10^{16}$ pieces/cm$^3$. Then, a similar molding process is performed.

What is claimed is:

1. An apparatus for plasticizing a material for molding thermoplastic resin foam comprising:

a screw cylinder;

said screw cylinder including:

a material supply opening formed adjacent to a rear end thereof;

an injection nozzle disposed at the leading end thereof;

a gas supply opening formed between said material supply opening and said injection nozzle and arranged to supply said screw cylinder with at least one of an inactive liquid having a super critical pressure and an inactive gas having a pressure not lower than the super critical pressure;

a screw disposed in said screw cylinder such that rotation and axial movement are permitted so that when said screw is rotated, thermoplastic resin is plasticized, and when said screw is moved in the axial direction, said plasticized thermoplastic molten resin is injected into a mold, said screw including:
- a first stage having a front portion formed into a first metering portion;
- a second stage having a front portion formed into a second metering portion and a rear portion formed into a low pressure portion in which the capacity of a screw groove is enlarged; and
- a screw head portion formed at the leading end of said screw cylinder, wherein said gas supply opening of said screw cylinder is formed at a position corresponding to said low pressure portion in said second stage.

2. An apparatus for plasticizing a material for molding thermoplastic resin foam according to claim 1, wherein said screw has said second stage formed into a multi-flight structure.

3. An apparatus for plasticizing a material for molding thermoplastic resin foam according to claim 1, wherein said screw incorporates a mixing piece disposed in the leading end portion of said second stage thereof.

4. An apparatus for plasticizing a material for molding thermoplastic resin foam according to claim 1, wherein said screw head portion is provided with a ball-check counter-flow preventive unit.

5. An apparatus for plasticizing a material for molding thermoplastic resin foam according to any one of claim 1, wherein said screw cylinder has a plurality of grooves formed in the axial direction and provided for the inner surface of said screw cylinder adjacent to said material supply opening.

6. An apparatus for plasticizing a material for molding thermoplastic resin foam according to claim 1, wherein said gas supply opening of said screw cylinder is provided with a heat-resisting gas permeable member.

* * * * *